Inventors.
Douglas S. Montgomery
Basil I. Parsons

Inventors
DOUGLAS S. MONTGOMERY
BASIL I. PARSONS

Dec. 17, 1968  D. S. MONTGOMERY ET AL  3,417,028
PROCESS FOR THE PREPARATION OF AN INORGANIC GEL HAVING
A PREDETERMINED PORE STRUCTURE
Original Filed July 3, 1961  14 Sheets-Sheet 10

Inventors.
DOUGLAS S. MONTGOMERY
BASIL I. PARSONS

United States Patent Office 3,417,028
Patented Dec. 17, 1968

3,417,028
PROCESS FOR THE PREPARATION OF AN INORGANIC GEL HAVING A PREDETERMINED PORE STRUCTURE
Douglas Sargent Montgomery, 101 Broadway, Ottawa, Ontario, Canada, and Basil Ian Parsons, R.R. 1, Kars, Ontario, Canada
Continuation of application Ser. No. 121,549, July 3, 1961. This application Feb. 10, 1967, Ser. No. 615,263
13 Claims. (Cl. 252—317)

ABSTRACT OF THE DISCLOSURE

At least one water dispersible, organic polymer selected from the group consisting of polyvinyl alcohols, polyethylene glycols, polyethylene oxides, methyl celluloses and polyacrylamides is incorporated into a hydrous gel of alumina, silica or an alumina-silica, in an amount of not less than 30% based on the weight of the anhydrous alumina or silica present. The mixture is calcined to remove the polymer completely, resulting in an inorganic produce of increased pore volume and pore size.

---

This application is a continuation of S.N. 121,549, filed July 3, 1961, and now abandoned.

This invention relates to the production of hydrous oxide gels such as alumina, silica, or silica-alumina gels. The invention has particular reference to a process for obtaining a controlled pore size distributon and an enlarged and controlled pore volume in gels such as silica gel or hydroxide gels such as aluminum, iron, copper, nickel, etc. making them suitable for various applications, for example, high temperature catalytic conversion processes, molecular sieves, chromatography, and thermal insulation. Gels of this type comprise essentially an inorganic structure in which there are pores or spaces.

A wide variety of methods are known for the preparation of inorganic gels. For example, hydrous aluminum or ferric hydroxide can be precipitated from a solution of a salt such as aluminum or ferric nitrate with a base such ammonium hydroxide. Hydrous silica gel can be made by adding hydrochloric acid to a dilute solution of water glass or sodium silicate. A commercial variation of this method for silica is to bring about the formation of the gel by the addition of carbon dioxide which can be recovered in subsequent steps. Mixtures of silica-alumina gels which are of considerable importance for the catalytic cracking of petroleum materials are often prepared by blending weakly acid or alkaline silica gel with a solution of aluminum sulphate, followed by appropriate exchange and washing cycles to lower the sodium content of the gel. In every case the final form of the gel is prepared by drying the hydrous material. It is in the drying process that the porous nature of the substance is created. The mass of the gel shrinks in size as the bulk of the water (or other appropriate solvent) is driven off. Eventually, the skeleton of the gel sets and the space remaining when the last of the solvent is removed comprises the porous nature of the material.

Up to the present time no serious attempt has been made to devise ways and means of controlling the pore size (or volume) distribution in inorganic gels. Previous investigators have spoken loosely about improvements in the "porosity" or "density" of gels in certain limited cases, without indicating either where, or to what extent the changes reflect control of the pore size distribution. Processes have also been described using organic addition agents for the improvement of "particle size" or "catalytic activity" with only vague references to concomitant changes in the porosity of gels. The basis of several of these processes for increasing the porosity of gels is the alteration of the surface tension of the liquid contained in the gel. The principle being that by lowering the surface tension of the liquid, the forces tending to draw the inorganic matter together are similarly reduced resulting in a more open structure. One method of achieving this reduction in surface tension is by heating the gel mass under high pressure above the critical temperature of the solvent. Under these circumstances the liquid can be removed in the vapour state with no surface tension effects. A modification of this technique is described as a hot sweating process in which a gel, primarily silica gel, is heated from 80° to 150° C. without allowing the escape of water. By this means the gel is set in a way which reduces the extent of shrinkage in subsequent conventional drying operations. Another method entails the solution of small amounts of surface active agents to depress somewhat the surface tension of the liquid in the gel. Experiments made by the present inventors indicate that the extent of change in the pore volume distribution by the addition of surfactants is very small. Any changes sometimes brought about in the density of the gels by surfactants is due largely to the incorporation of air into the gel and the formation of a relatively stable foam structure. Still another method of resisting the surface tension forces tending to collapse the gel structure has been by the addition of certain inorganic ions in solution to strengthen the gel skeleton. Very little work has been done along these lines and the principles behind the technique have not been established.

A variety of leaching processes have been used as a means of increasing the porosity of gels. For example, hydrous silica gel soaked in a solution of a metallic salt, such as calcium chloride, can be then dried and freed of the salt by washing. Similarly, pellets or extruded shapes of hydrogel containing calcium carbonate can be formed and then dried and finally extracted with acid to remove the calcium carbonate. Very large pores have been created in gels by the inclusion of starch. The starch first swells to expand the gel structure and can be removed later by washing. Soaps have also been included in the solutions used to prepare silica gels and afterwards removed by washing.

Several processes involving volatilization and gasification for the improvement of the porosity of siilca gel have been reported as well. Finely divided or colloidal sulphur suspended in the wet gel can be later distilled out of the finished product. Soluble polysulphides have been used for the same purpose. A silicic acid foam has been prepared by gelatinizing a sodium silicate solution with carbon dioxide followed by treatment with hydrochloric acid to react with the sodium carbonate formed. The carbon dioxide regenerated in this process is retained within the plastic gel to form a voluminous foam-like structure. Another instance of gasification is the case where a plastic gel is subjected to a high pressure of an inert gas in an enclosed vessel. The material can then be "popped" or foamed by suddenly releasing the pressure.

Still another approach to the problem of increasing the porosity of gels is based upon the inclusion of small quantities of organic matter in the gel. In one process the precipitation or formation of the gel is accomplished in the presence of organic matter such as the naturally occurring gums and resins, animal glue, gelatin or rubber latexes. The recommended concentration range is 3 to 30% organic matter with reference to the anhydrous oxide content of the gel. In another process the washed hydrous gel is suspended in an aqueous solution of an organic colloid such as gelatin, gum arabic or gum tragacanth above the setting temperature thereof, then cooled and dried at a low temperature and finally calcined. The concentration range in this process is not clearly established but it must be low as the solubility of natural resins is restricted.

None of the investigations mentioned above have provided any systematic means whereby specific changes in the pore size or pore volume distribution can be obtained. Measurements made by the inventors and their colleagues indicate that most methods merely bring about small increases in the size and number of the very large pores in the gel system under consideration. This is particularly true in those cases where organic matter is mixed with a gel by any convenient means, partially dried, then extruded or pelleted prior to calcination. Basically similar results are obtained when sulphur, graphite or any other binding material is added prior to tableting or extrusion. Regardless of how the gels are handled, however, the effects obtained with substances such as gelatin, gum arabic, glue, skim milk, starch, etc., are very small by comparison to the changes brought about in the present process. When surface active agents were used to increase the porosity of gels the effects were also small. With some of the surfactants it has been found that their prime function is to permit the incorporation of air into the hydrous gel such that a foam can be formed.

In accordance with the present invention there is provided a process for preparing a dried inorganic gel having a predetermined pore structure comprising the steps of, incorporating into said gel at least one water dispersible organic polymer to form a hydrous mixture of gel and polymer, in a weight percentage of the weight of anhydrous oxide of 30% up to 20,000% (as limited by dispersibility), drying the hydrous mixture to set the pore structure of the gel, and removing the polymer from the gel.

In the process described herein a means is provided whereby excellent control of both the pore size distribution and the pore volume distribution can be obtained. The control is accomplished by means of modifications in the precipitation and drying of the gels. In practicing the present invention, it is proposed to add 30 to 20,000% water soluble organic polymer (based upon the anhydrous oxide content) to a gel of the type described during its preparation. For many applications it is sometimes more convenient to refer the content of the organic matter to the weight of the mixture of hydrous gel and additive rather than to the weight of anhydrous oxide eventually obtained. Based upon the combined weight of hydrous gel and additive, the content of organic matter for the present process is of the order of 3 to 80%. With certain types of polymers 40 to 80% is required to effect changes in the pore size distribution. With others 3 to 30% is sufficient. The water content of the hydrous gel depends entirely upon the system under consideration and the degree to which the gel has been pressed. In commercial practice water contents of 85 to 95% are common for alumina or silica gels.

The pore volume contained in alumina, silica and silica-alumina gels prepared by conventional methods is, in general, of the order of 0.3 to 0.8 ml./gm. of solid. Within certain limits the pore volume in a particular system can be varied by changing the concentrations of the reagents used to prepare the gels or by changing the time and temperature conditions of its preparation. There is, however, a very definite limit to the extent to which the pore volume can be increased or decreased by changes of this type. Also, there is evidence to indicate that the changes in pore volume achieved by these methods are actually only a reflection of a shift in the pore size distribution. For example, in the silica gel system the more concentrated the solutions used to prepare the gel, the larger is the avergae pore size and the greater is the pore volume. Similarly, the longer silica gel is allowed to remain in its hydrous form, prior to drying or calcination, the larger is the average pore size that results.

The purpose of adding water soluble organic polymers to the gels in the course of their preparation was to gain an additional measure of control over the pore size distribution and pore volume. Experiments have shown that total pore volumes as great as 5.0 ml./gm. can be obtained through the proper balance of concentration and additive.

The following examples indicate ways of carrying out the invention and illustrate the general method of preparation.

EXAMPLE 1

The following example illustrates the method of preparing a highly porous form of alumina by precipitating aluminum hydroxide gel in the presence of approximately 10% by weight of polyvinyl alcohol (sold under the Trademark Gelvatol-1-30) with a molecular weight of approximately 15000. Stock solutions were prepared:

Solution 1: 100 gms. of $Al(NO_3)_3.9H_2O$ and 100 gms. of Gelvatol-1-30 were dissolved in water to form one liter of solution.

Solution 2: 300 ml. of concentrated ammonium hydroxide (28% solution of ammonia) and 200 gms. Gelvatol-1-30 were dissolved in water to form 2 liters of solution.

The gel was precipitated by adding solution 1 to solution 2 with vigorous stirring. A high speed beater type stirrer has been found satisfactory. After precipitation, the stirrer was kept in operation in the slurry for approximately 10 minutes to ensure complete mixing. While the speed and type of beater is not particularly critical, the precipitate and solutions should be well mixed. At this stage, in the case of the preparation of alumina gel, it is possible to remove the water by drying at room temperature or at higher temperatures up to 150° C. Where the gel has to be washed or if a large volume of supernatant liquid is present the gel must be filtered. Gels of the alumina or silica type containing additives have been successfully filtered using pressure or vacuum filters or a basket centrifuge. In the example under consideration the excess liquid was removed in a stainless steel pressure filter at 50 p.s.i. The filter cake was then dried at 130–140° for approximately 24 hours and finally calcined in air at 550–600° C. for 3 to 4 hours until all the carbon associtaed with the organic matter was removed. To produce a gel of high purity the polymer should yield as little ash as possible.

EXAMPLE 2

While the process just described is normally satisfactory, the filtration and washing cycles in the case of those gels where washing is required, can often take at least a week to complete, particularly if the concentration or molecular weight of the addition agent is high. It has been found that the washed filtered gel prepared without any polymer addition agent can be made to take up the polymer very satisfactorily. This method is advantageous for those gels which can be obtained commercially in the hydrous form. The following example for the preparation of a series of porous alumina-silica gels (approximately 9% $SiO_2$ and 91% $Al_2O_3$) is by way of illustration. Stock solutions were prepared as follows:

Solution 3: 200 gms. $Al(NO_3)_39H_2O$ in 1000 ml. water.
Solution 4: 27 gms. $Na_2SiO_39H_2O$ in 1000 ml. water.

The gel was formed by adding a solution of 1800 ml. aluminum nitrate stock solution and 1800 ml. water to a solution containing 900 ml. sodium silicate stock solution, 1350 ml. of 1:1 ammonium hydroxide and 2250 ml. distilled water. The solutions were mixed together in a 10-liter vessel using a standard beater type mixer. The precipitate was then allowed to stand overnight to settle. The gel was separated from the bulk of the liquid in a five-gallon laboratory pressure filter. The cake of wet gel was washed twice with 1:1 ammonium hydroxide solution to reduce the sodium content of the gel. In each wash cycle the filtered cake was removed from the pressure filter and slurried for approximately 10 minutes in a solution of 900 ml. of 1:1 ammonium hydroxide and 810 ml. of distilled water. The water content of the hydrous gel cake after the final washing and filtration was approximately 92–93%.

In one series of tests, by way of example, the washed and filtered batch of gel was divided into 6 parts by weight. One portion was dried and calcined in the normal way for reference purposes. Varying amounts of molten polyethylene glycol (sold under the trademark Carbowax-4000) of molecular weight approximately 3000 to 3700 were added to the remaining samples to form mixtures in the range of 10 to 80% by weight of additive; i.e., to form an 80% mixture, 400 gms. of Carbowax was added to 100 gms. of hydrous gel. Each mixture of wet gel and Carbowax was slurried for 20 minutes with the agitator. The slurry was then poured into an open pan and dried for 12 hours at 200–250° C. and finally calcined in air at 550–600° C. for 5 hours.

The following illustrates this method still further. Samples of hydrous alumina gel were mixed with 10, 20 and 40% by weight methyl cellulose (sold under the trademark Methocel USP 400). This type of substance is reported to be normally soluble in water to only a few percent at room temperature. The effect, however, was found to extend far beyond the reported solubility range. A kneading action was used to blend the cellulose substances into the gel. The mixtures were then left to stand overnight to allow the cellulose to swell and absorb as much water as it could. As before, the gel was put into an open pan and dried for 12 hours at 200–250° C. then calcined in air at 550–600° C. for 5 hours.

EXAMPLE 3

The following example illustrates the method of preparing a highly porous form of silica gel by the addition of approximately 37.5% polyethylene glycol (Carbowax-20M) of average molecular weight 17000 to the hydrous gel. Stock solutions were prepared as follows:

Solution 5: 250 ml. of water glass (Philadelphia Quartz Co. type N water glass 28.7% $SiO_2$, and

$Na_2O:SiO_2 = 1:3.22$ was diluted with 687 ml. of water.

Solution 6: 150 ml. 4 N hydrochloric acid was diluted with 475 ml. water.

The gel was prepared by adding solution 6 to solution 5 as quickly as possible with vigorous stirring. The resultant solution was stirred vigorously for about 10 seconds then poured into an enamelled tray to set and age for a period of about 15 hours. To exchange and wash the gel in the present test, the gel was cut into ¾ inch cubes and placed in a Sohxlet type extraction flask and exchanged with 1 N HCl solution for six hours then washed with distilled water for 18 hours. (Once the gel is set it is the operator's choice how the exchange and washing operations are accomplished. Standard practice is to either slurry the gel with suitable solutions or to cut the gel into sections and to wash the piece until the sodium content is reduced to the desired level). The cubes of the washed hydrous gel were then blended to an even consistency with a beater type stirrer. Approximately 37.5% by weight of molten Carbowax 20M was added and the mixture stirred and worked for 30 minutes. To obtain a uniform product it is important that the addition agent be uniformly distributed through the gel. The paste was then spread out in Pyrex trays and dried in an over for 24 hours at 200° C. and finally calcined at 550°–600° C. for approximately 4–6 hours or until no carbon residue remained.

For small samples the gels can be inserted directly into the calcining furnace. For large batches, however, it has been found that the calcination must be first started in an inert atmosphere, or in an atmosphere containing only a small amount of oxygen. If air is used directly with a large sample the temperature of the gel rises far above 600° C. due to the heat of combustion of the additive and the porosity of the final product is reduced because of sintering. This precaution must be taken in all those cases of gels where high temperatures alter either the structural or crystal form of the finished material. Ultimately, the residue of carbon must be removed by conventional calcining practice.

Where the gels cannot be heated to the temperature necessary to remove the organic polymer by calcination or combustion techniques, a satisfactory method is hydrogenation. Many of the polymers found to be effective in this invention contain either oxygen linkages or side groups which can be broken or attacked with hydrogen. The important step to accomplish is the removal of the organic matter. Oxidation, hydrogenation or hydrocracking are all effective methods. The selection of the best procedure is governed by requirements, circumstances and cost.

The polymeric addition agents that have been tested and found to have notable effects are:

(1) The polyethylene glycols (Carbowax) or the polyethylene oxides (Polyox) manufactured by Carbide and Carbon Chemicals Co., New York City.
(2) The methyl cellulose ethers (Methocel) manufactured by the Dow Chemical Co., Midland, Mich.
(3) The polyvinyl alcohols (Gelvatol) manufactured by the Shawinigan Resins Co., Springfield, Mass.
(4) The polyacrylamides (Pam, Cyanamer or Superfloc) manufactured by the American Cyanamid Co., New York City.

As discussed below, the concentration range of the addition agent, from a few percent upwards, and the molecular weight, from one thousand to several hundreds of thousands, may be varied depending upon the pore size that it is desired to create in the calcined gel.

To obtain high concentrations of polymer in the solutions, particularly the high molecular weight species, considerable care has to be taken in the preparation of the solutions. If the rate of stirring is too great during the solution process the tendency to bubble formation is high. The presence of a large amount of trapped air in the gels after the precipitation slows down the filtration and washing processes and generally reduces the ease of operation and handling. It is found best to melt the polymer, if the molecular weight and type of material allow, and to add the melt slowly to water at 50–70° C. with medium agitation. In the case of samples of polymer of very high molecular weight the resins are added slowly (over a period of one to three hours) to cool water with moderate stirring. After the resin is thoroughly dispersed, the temperature is raised slowly to speed the solution process. The tendency for bubble formation is greatest during the heating cycle, and agitation at this stage is kept to a minimum.

The accompanying drawings to be enumerated below show curves of cumulative pore volume against pore radius for differing concentrations of, and different polymers.

The cumulative pore volume distribution in the various samples was determined by the method of mercury penetration briefly as follows: A weighed sample of dried gel was placed in a dilatometer and evacuated overnight in a glass apparatus at a temperature of approximately 200° C. The dilatometers were then filled with mercury at approximately 1 p.s.i.a. The pressure over the surface of the mercury in the dilatometer was increased in stages up to atmospheric pressure and the cumulative pore volume at each pressure stage was determined by the change in level of the mercury in the dilatometer. Up to one atmosphere pressure the level of mercury in the dilatometer was determined with a cathetometer. At one atmosphere the dilatometers were transferred from the glass apparatus to a steel pressure vessel and the pressure increased in stages up to 60,000 p.s.i. The change in level of the mercury at the elevated pressures was determined by measuring the resistance (and hence the length) of a fine platinum wire threaded along the capillary of the dilatometer. The radius of the smallest pores that mercury can enter at any given pressure was calculated from the equation:

$$r = 10^6/P$$

$r$ = radius of smallest pores that mercury can penetrate in angstrom units
$P$ = pressure in pounds per square inch.

The cumulative pore volume at various pore radii, or the pore volume distribution, is then known.

In the accompanying drawings of graphs of the cumulative pore volume against pore radius for a variety of gels;

In any discussion of the results of the overall investigation a number of classifications are possible depending upon whether interest centres upon the addition agent, the method of preparation or the effect obtained. In the discussion which follows, the results have been classified into three groups centering on the overall effect of the addition agent.

It is important to appreciate that almost every soluble or dispersible polymer substance has some effect on the porous properties of an inorganic gel. With certain polymers the effects are large, with others, the effect is small. In the beginning, it was thought that certain of the polymers could be classed as ineffective, but bulk density measurements have shown since that frequently the apparently "ineffective" polymers actually bring about a significant increase in the pore volume contained in very large pores or cracks. It is believed that the situation that arises in these instances is comparable to the case where a low density bulking agent such as vermiculite is added to concrete to form low density concrete blocks. With inorganic gels, however, the situation differs in that the bulking agent can be removed from the system by calcination, leaving a void in the structure.

Group 1 Additives

Polymers such as the polyethylene glycols (the Carbowax compounds) and the polyethylene oxides (the Polyox resins) bring about a very large increase in the pore volume contained in the pore size range 1000 to 20 A. radius. With only modifications in degree, this effect occurs with (a) all inorganic gels presently in commercial use, such as alumina, silica and alumina-silica gels; and (b) with all grades and molecular weights of Carbowax and Polyox. Typical pore volume distribution curves for each type of gel are shown in FIGURES 1 to 6.

Figure 1:
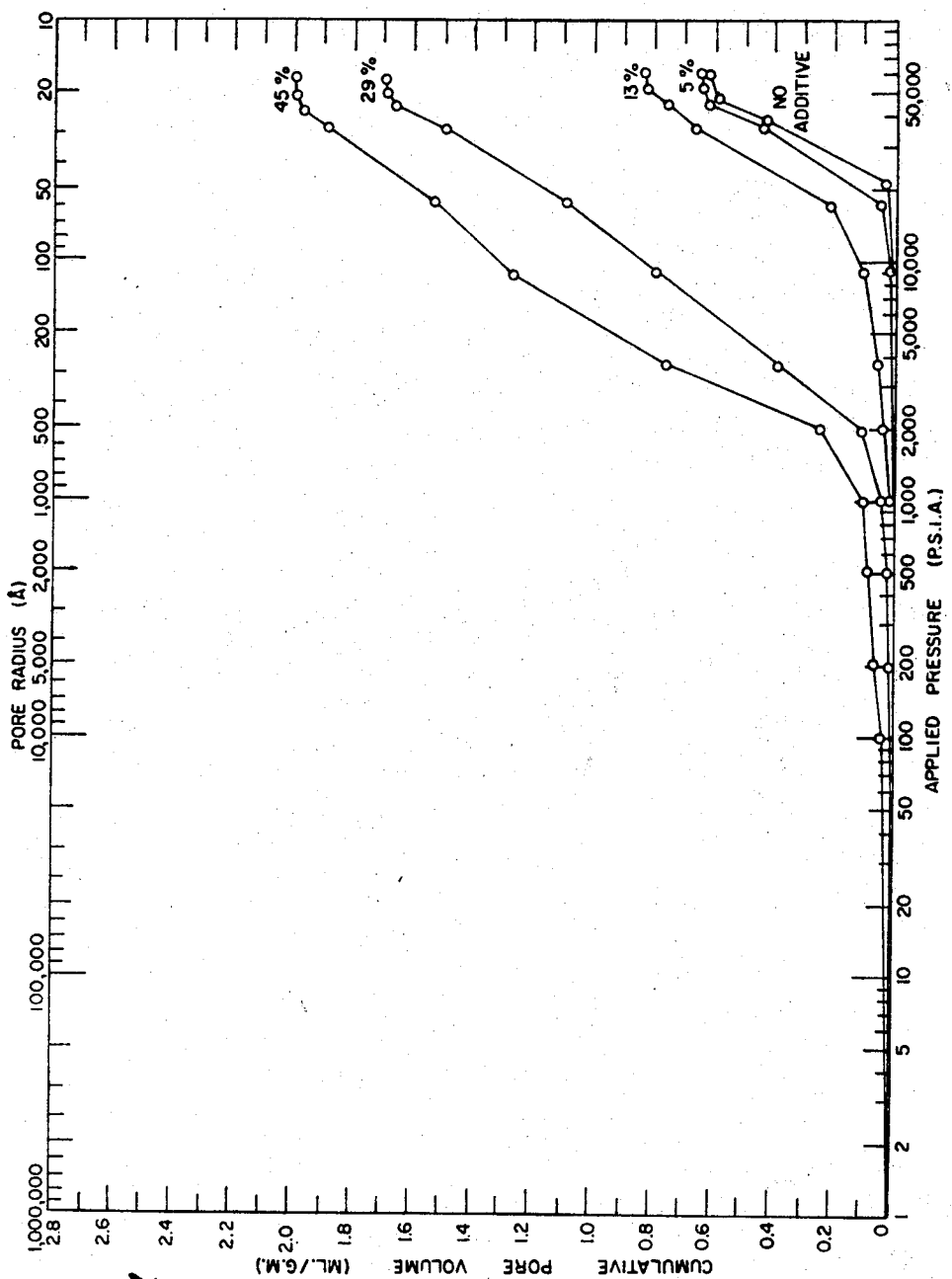
FIGURE 1 shows the effect of concentration of Carbowax 4000 on the cumulative pore volume distribution in alumina-silica gel. (Prepared by mixing molten Carbowax into the hydrous gel)

Alumina-silica gel, approximately 9% $SiO_2$, prepared without the use of a polymer addition agent normally has a pore system in the 100 to 20 A. range. The addition of Carbowax 4000 (M.W.=3000–3700) to the prepared gel in increasing amounts (as shown in FIGURE 1) progressively increases the total pore volume and widens the pore size distribution from 100 to 1000 A. Almost all of the increase in the pore volume brought about by the addition agent occurs as the result of the widening of the pore size distribution. In the gel prepared without additive, the total pore volume was 0.64 ml./gm. and the pore volume in the region 100 to 20 A. was 0.62 ml./gm. The total pore volume prepared with 45% Carbowax 4000 was 2.07 ml./gm. but the portion which occurred in the 100 to 20 A. range was only 0.72 ml./gm. Thus the addition of Carbowax 4000 to alumina-silica gel increased the pore volume in the macro pore range without changing the micro pore structure appreciably.

Figure 2:
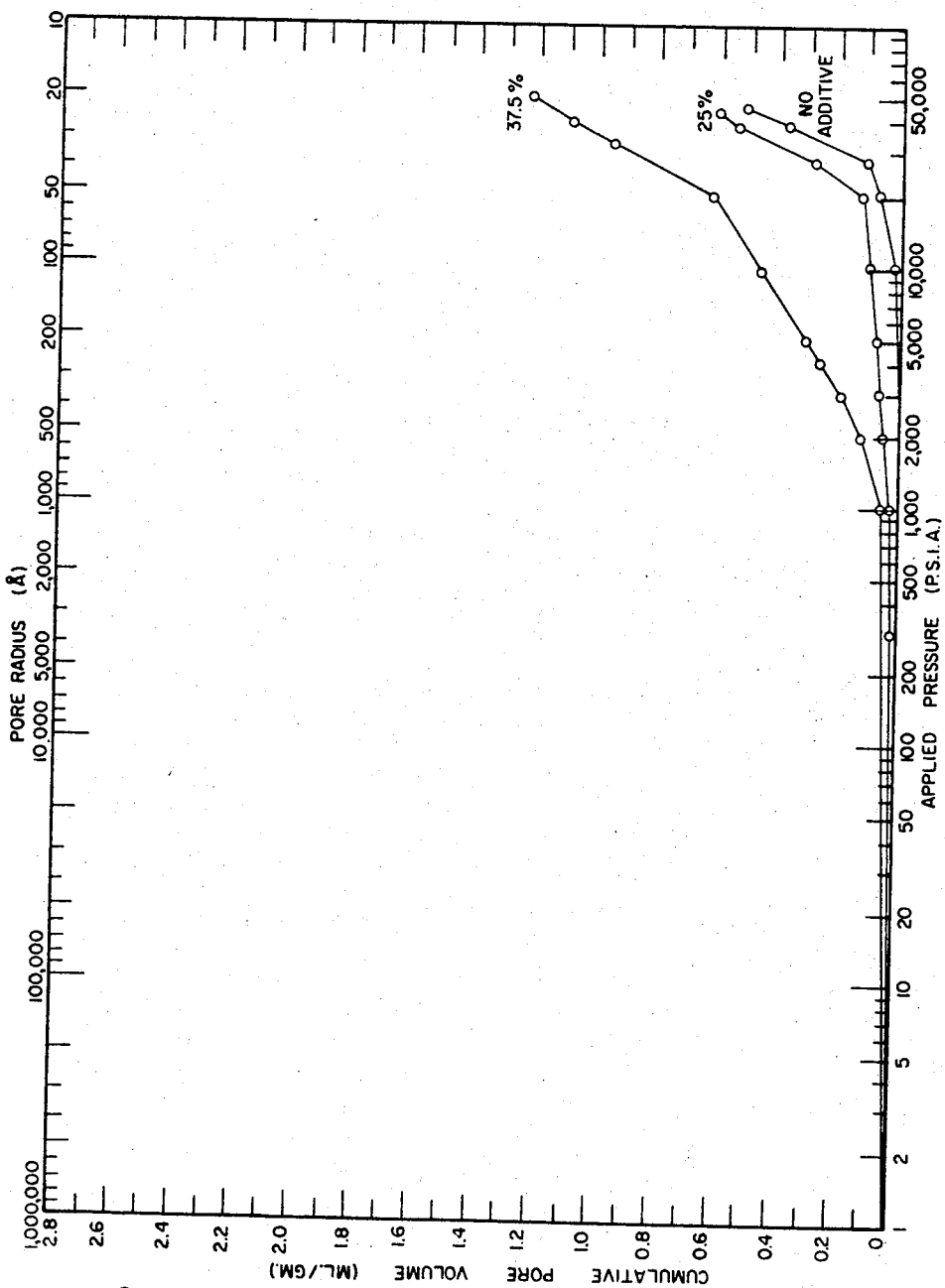
FIGURE 2 shows the effect of the concentration of Carbowax 20M on the cumulative pore volume distribution in silica gel. (Prepared by mixing the hydrous gel into a concentrated solution of Carbowax 20M)
Figure 3:
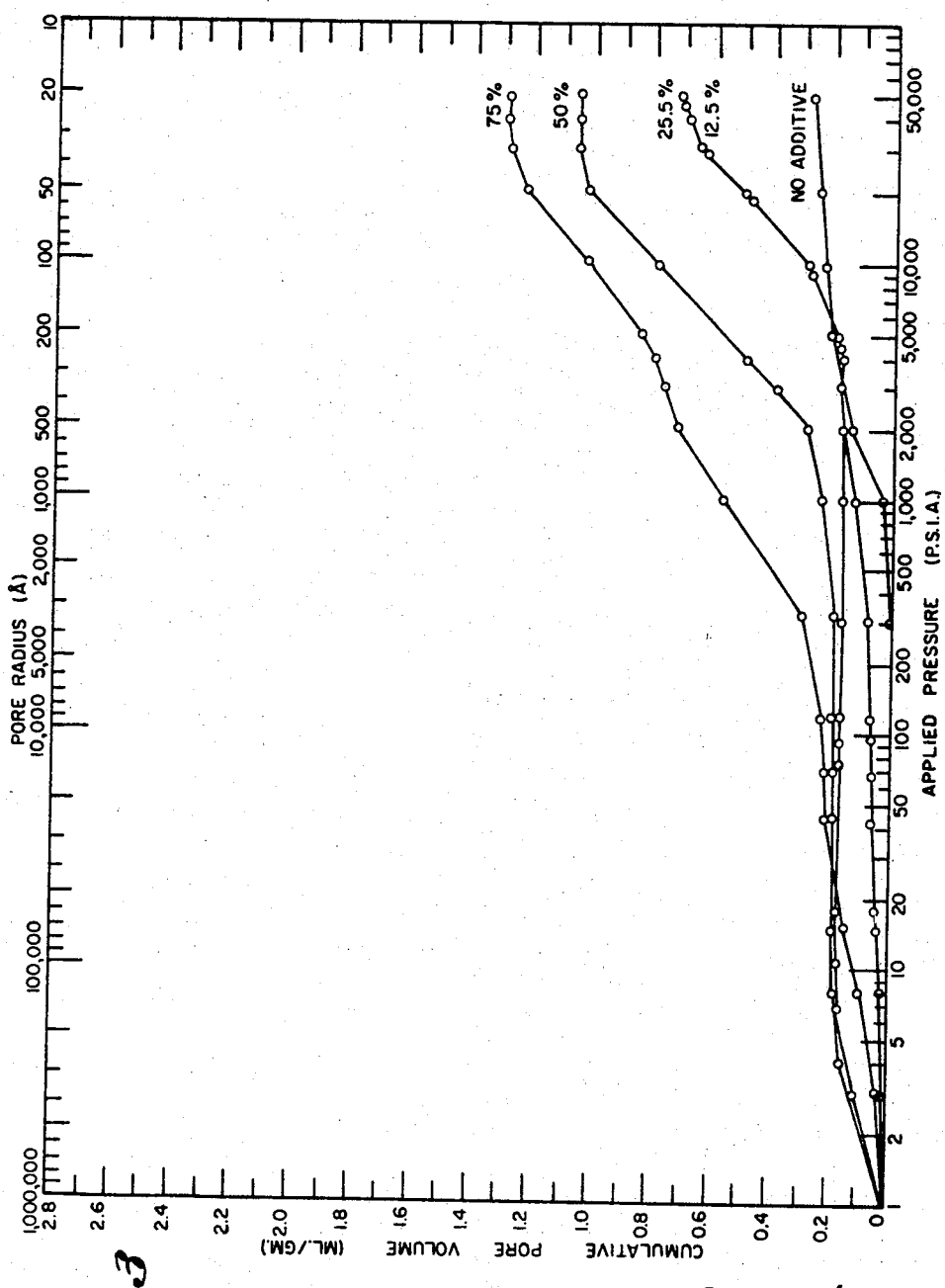
FIGURE 3 shows the effect of the concentration of Carbowax 4000 on the cumulative pore volume distribution in alumina gel. (Prepared by mixing molten Carbowax into the hydrous gel)

Much the same general effect as was obtained with Carbowax in the alumina-silica system occurred also with the pure silica and alumina gels. The broadening effect of Carbowax 20M (M.W.=15,000–20,000) on silica gel is shown in FIGURE 2. The direction of the change from the micro pore range into the macro pore region was the same as occurred in the alumina-silica system. In the case of pure alumina the normal pore size distribution occurred in the region 1000 to 200 A. The effect of the Carbowax (shown in FIGURE 3) was to extend the pore size distribution from the macro pore region into the micro pore range. The direction of the change is opposite to that observed with alumina-silica gel and the pure silica gel.

Figure 4:
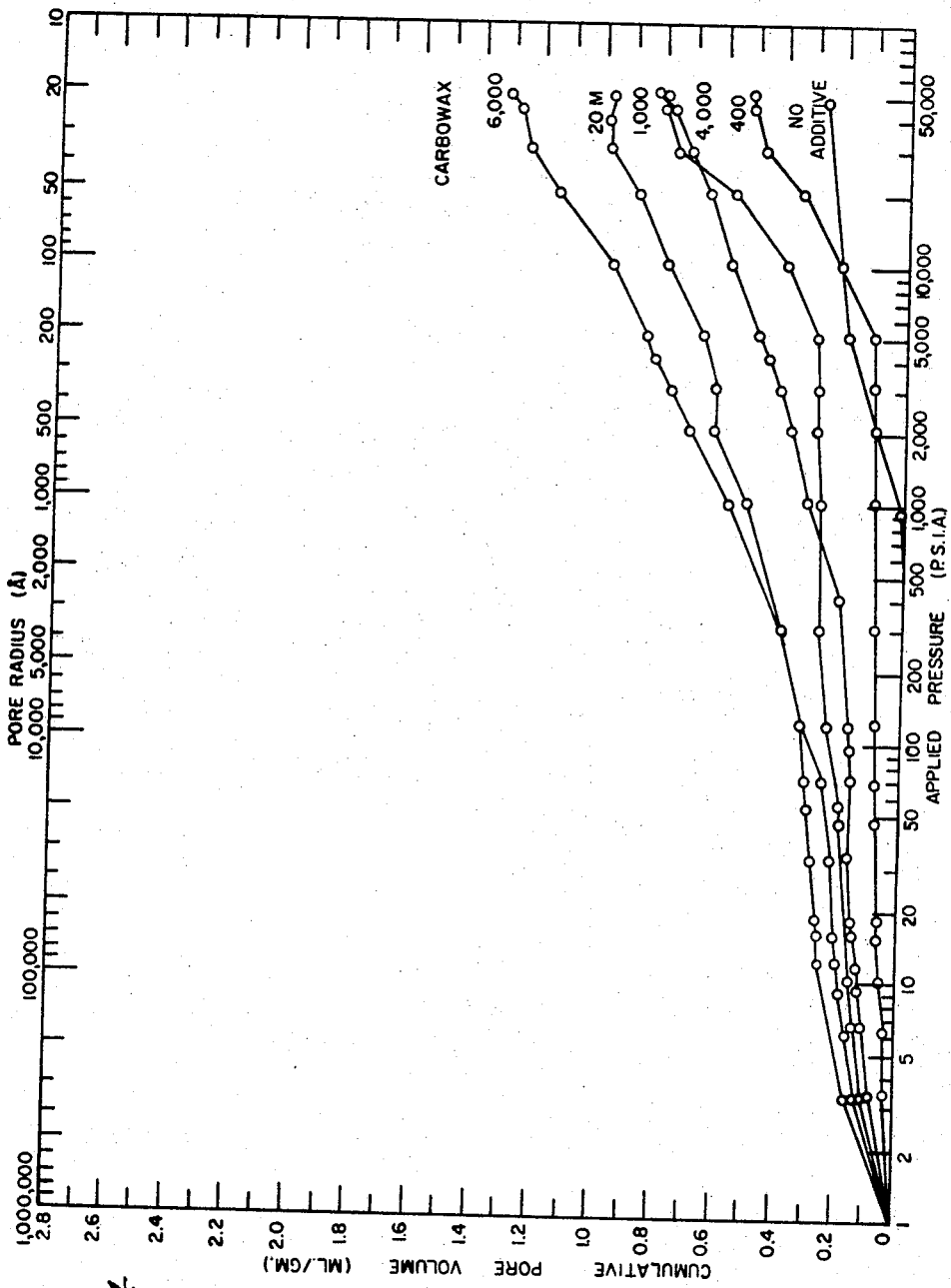
FIGURE 4 shows the effect of the molecular weight of Carbowax on the cumulative pore volume distribution in alumina gel. Concentration of Carbowax=37.5% by weight. (Prepared by mixing the molten Carbowax into the hydrous gel)

The effect of the molecular weight of the Carbowax compounds on the pore size distribution in pure alumina gel is shown in FIGURE 4. The low molecular weight compounds shifted the pore size distribution from the region of 1000 to 200 A. completely into the micro pore range. The higher molecular weight compounds broadened the pore size distribution in both directions to 10,000 A. and to 20 A. With the exception of the curve shown in FIGURE 4 for Carbowax 20M, the higher the molecular weight of the Carbowax polymer, the greater the broadening effect on the pore size distribution and the greater the total pore volume.

The effect of increasing molecular weight of Carbowax compounds on the silica and alumina-silica gels is to increase the macro pore structure leaving the micro structure largely unaffected and follows a similar pattern to that of the concentration curves of FIGURES 1 and 2.

Figure 5:
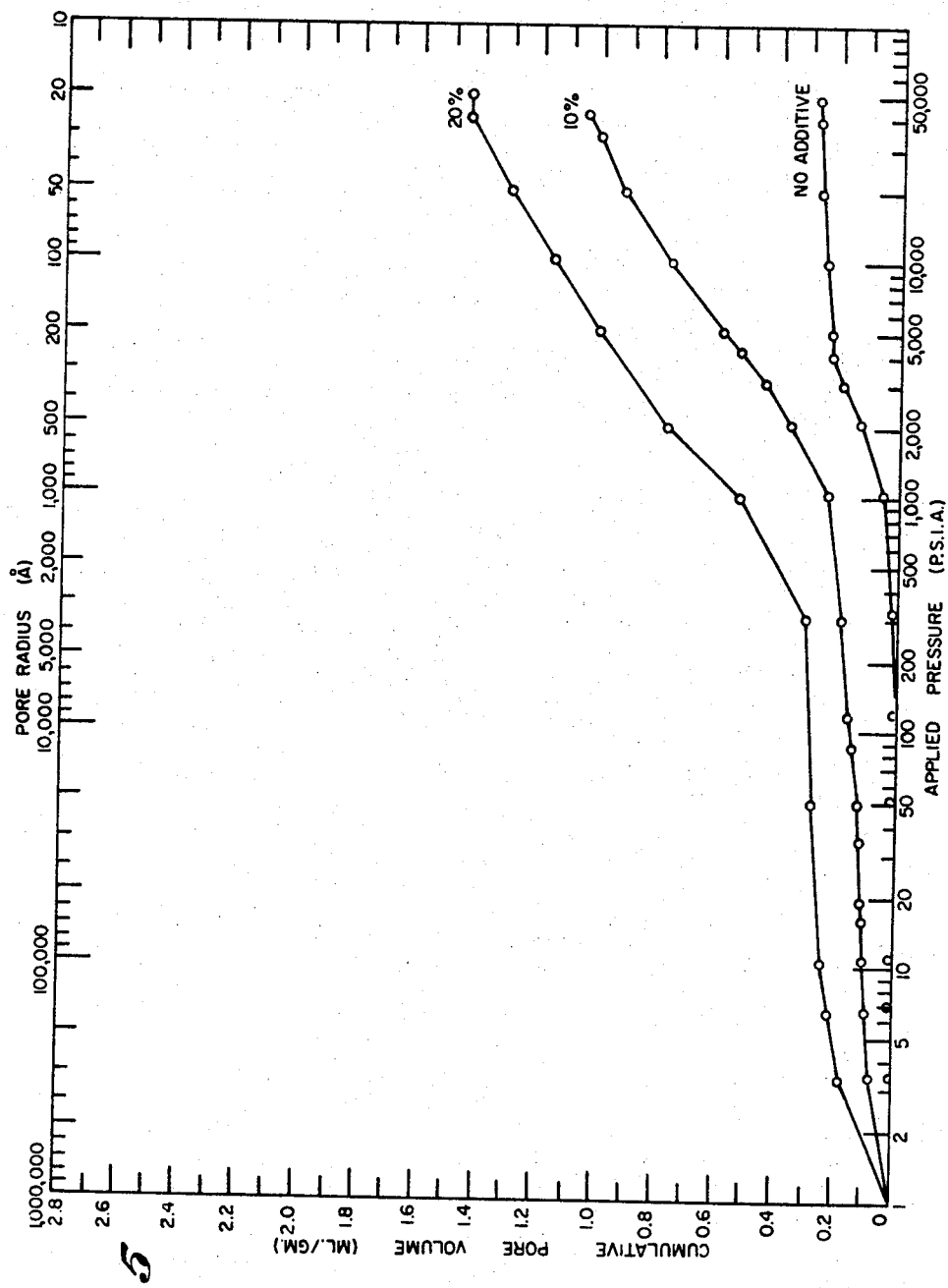
FIGURE 5 shows the effect of the concentration of Polyox Resin WSR-35 on the cumulative pore volume distribution in alumina gel. (Dry powder blended into the hydrous gel)
Figure 6:
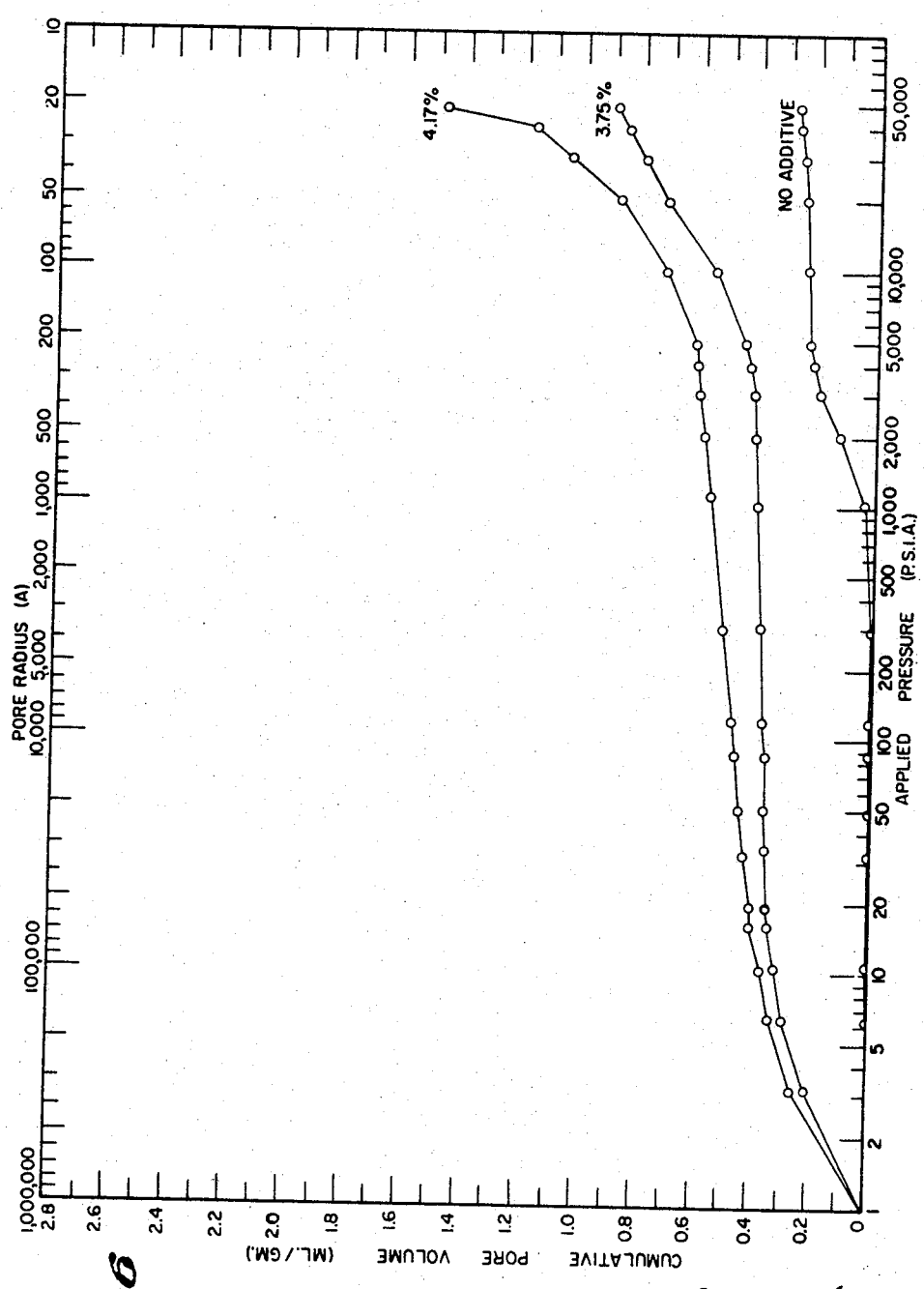
FIGURE 6 shows the effect of the concentration of Polyox Resin WSR-35 on the cumulative pore volume distribution in alumina gel. (Prepared by mixing the hydrous gel into a concentrated solution of Polyox)

The Polyox resins are very similar in chemical composition to the Carbowax series of additives. The average molecular weight of these polymers is estimated at several hundreds of thousands by the manufacturer. The effect of Polyox on the pore system of alumina (as shown in FIGURES 5 and 6) and also silica and alumina-silica is very similar to the effect of the Carbowax compounds. The results with Polyox can probably be regarded as an extension of the general effect of the molecular weight of the Carbowax compounds into the very high molecular weight range.

The increase in the pore volume and the changes brought about in the pore size distribution by the Carbowax and the Polyox compounds occur whatever the method of preparing the mixture of the hydrous gel and polymer, i.e., the increase and changes occur whether the gel is precipitated directly in the presence of the dissolved polymer, or whether the additive is blended into the hydrous gel after its preparation.

Group 2 additives

Figure 7:
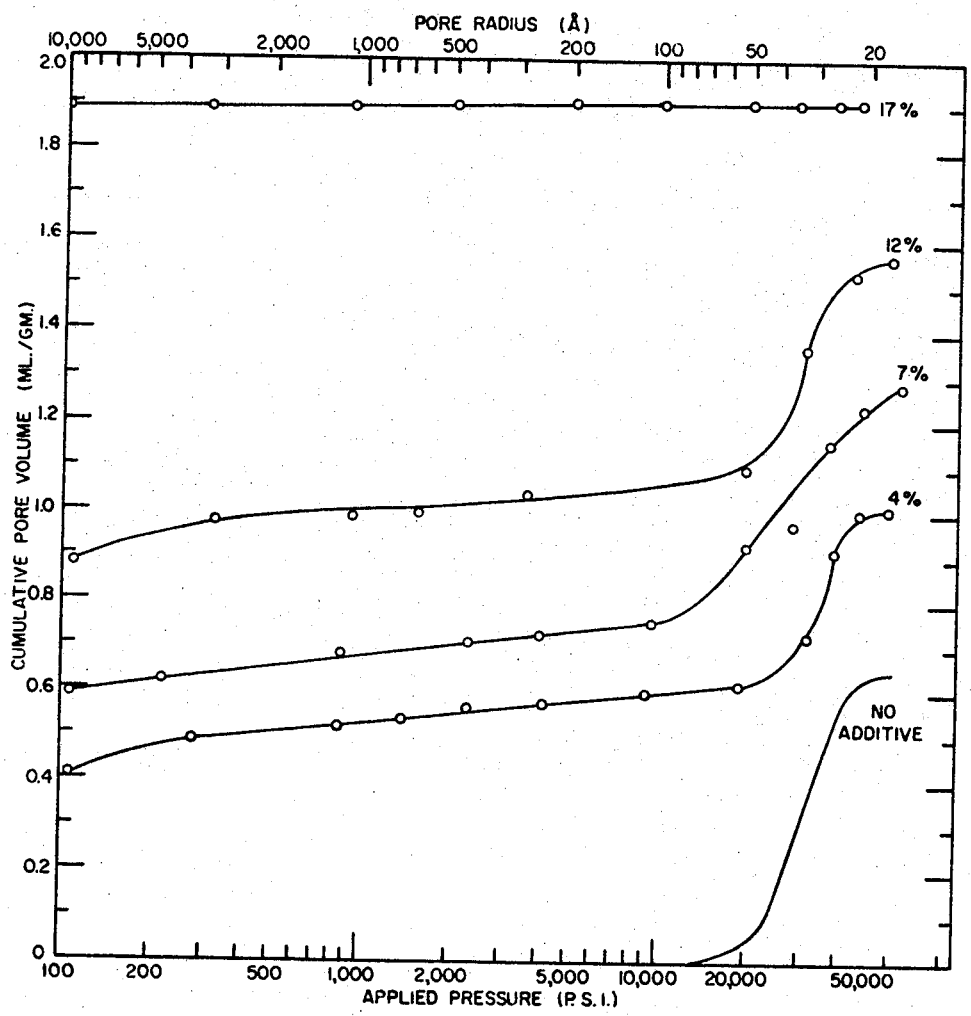
FIGURE 7 shows the effect of the concentration of Methocel USP-400 on the cumulative pore volume distribution in alumina-silica gel. (Dry powder blended into the hydrous gel)
Figure 8:
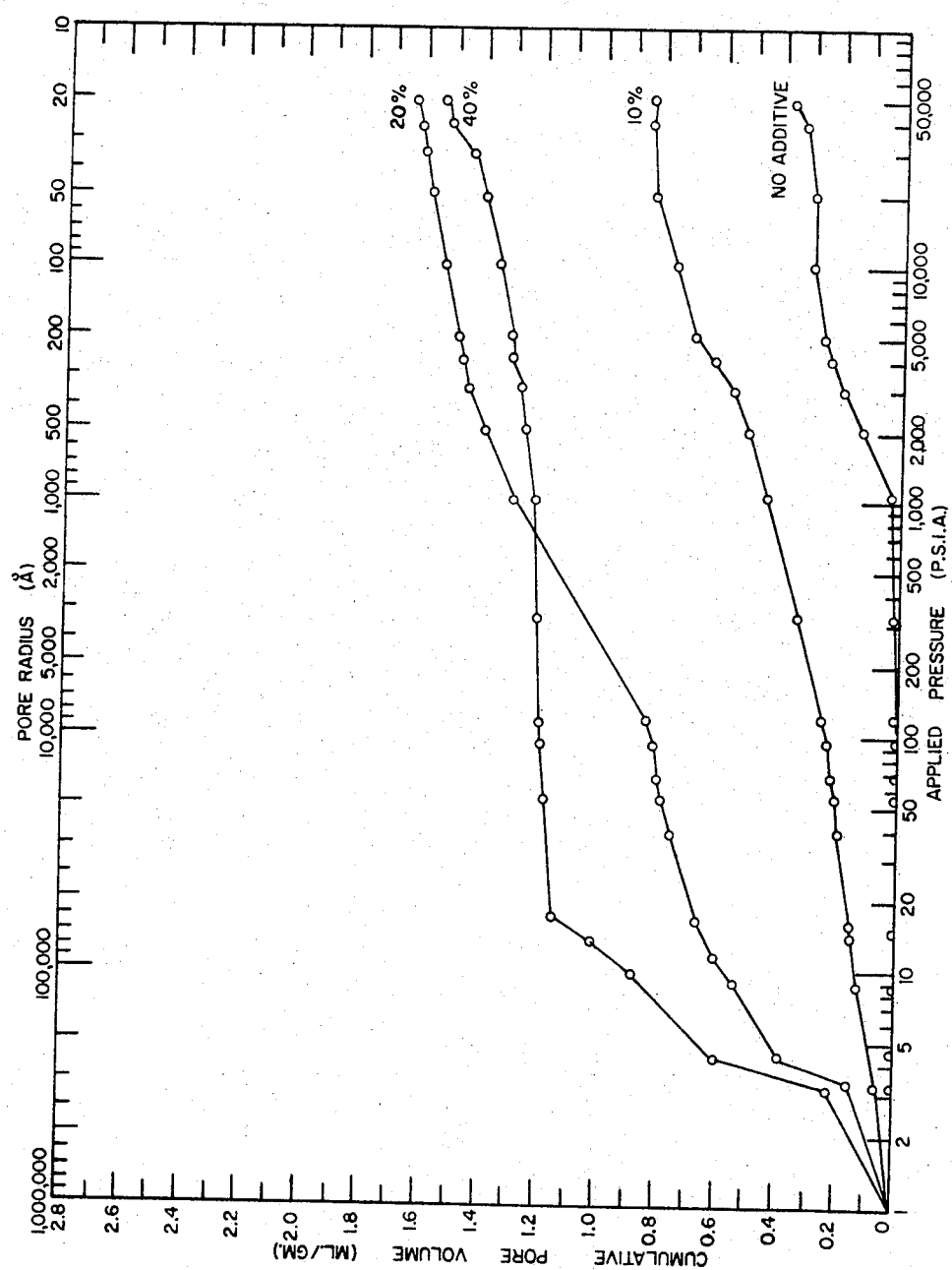
FIGURE 8 shows the effect of the concentration of Methocel USP-400 on the cumulative pore volume distribution in alumina gel. (Prepared by kneading the hydrous gel into the additive)
Figure 9:
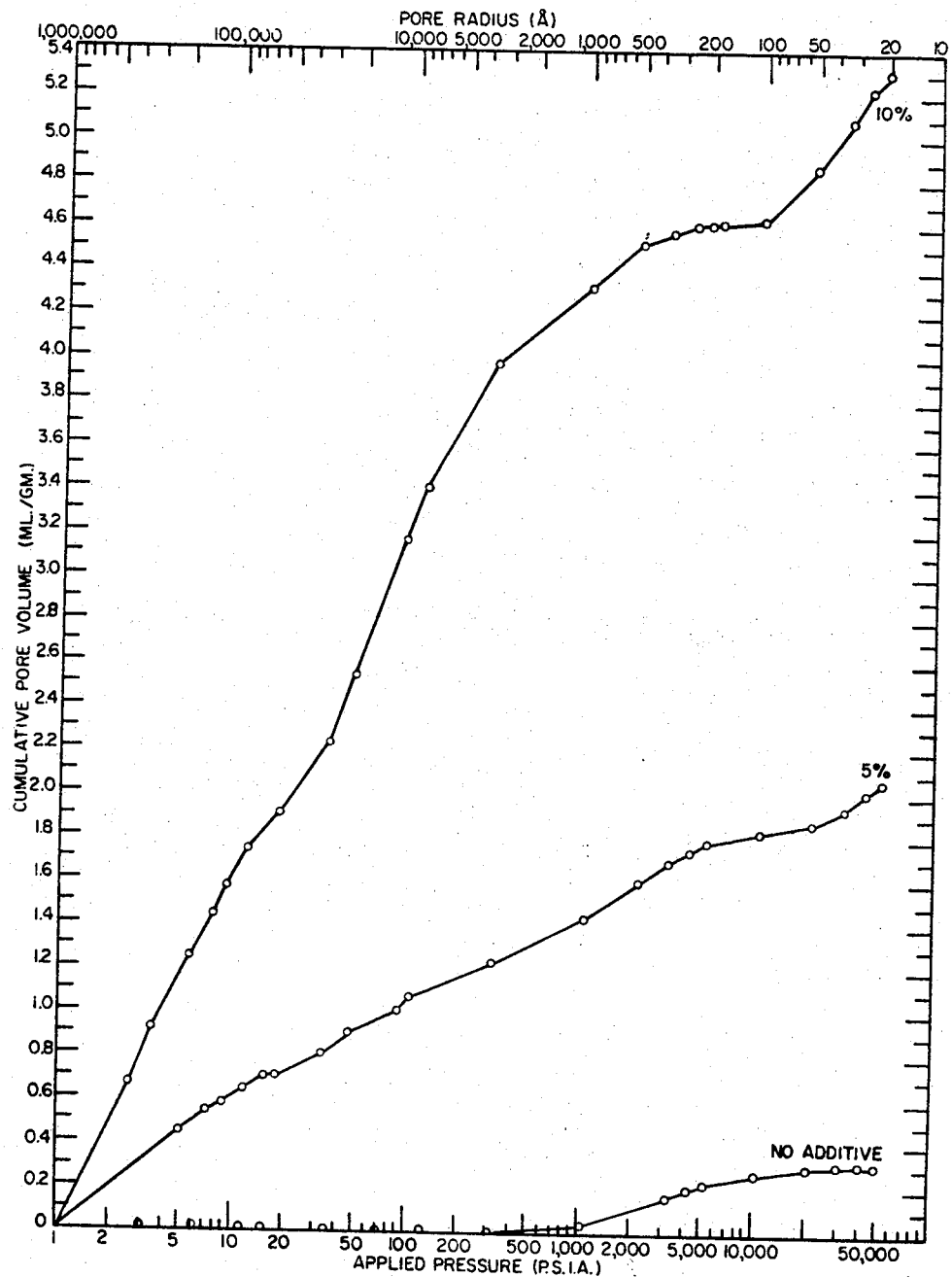
FIGURE 9 shows the effect of PAM-75 on the cumulative pore volume distribution in alumina gel. (Prepared by precipitating the gel in the presence of the dissolved additive)

The second class of behaviour is shown by the Methocel series of additives in alumina-silica and in alumina gels in FIGURES 7 and 8. Similar effects are obtained with silica gels. Increasing concentrations of Methocel increased the total pore volume proportionately but this increase was by the creation of large pores. In the case of the alumina-silica gels, Methocel USP 400 when present in sufficiently high concentrations, appears to prevent the formation of the pore structure characteristic of the normal form, substituting in its place a large macro pore system. With the pure alumina gels the effect is similar except that at all practical concentrations of addition agent there still occurs a significant pore volume in the micro pore range.

The Methocel compounds are described as dimethyl ethers of cellulose. They differ from other derivatives of cellulose, and from virtually all other types of water soluble polymers in as much as a water soution of the compounds will form a rigid gel structure on heating.

In general, the mixture of hydrous oxide gel and Methocel cannot be prepared by dissolving the additive in the solutions used to prepare the gel. The reasons for this are twofold. First the solubility of Methocel in water is very limited. A practical working solution is 2 to 3% by weight. Even at this concentration the solutions are very viscous and difficult to manipulate. Second, in the cases where aluminum salts are present in the solutions, any Methocel added to the system forms a precipitate of unknown composition. In the examples shown in FIGURES 7 and 8, the powdered Methocel was blended or kneaded into the hydrous gels after they were formed.

Group 3 additives

The third type of effect on the pore size distribution is illustrated by the polyacrylamide (PAM) and the polyvinyl alcohol (Gelvatol) polymers. Typical pore volume distribution curves obtained with alumina gels prepared using these polymers are shown in FIGURES 9 to 12. These additives extended the pore size distribution in alumina in both directions from the normal to 100,000 A. and to 50 A., with a tremendous increase in the total pore volume of the gel. The largest pore volume obtained to date was 5.4 ml./gm. in the gel prepared using 10% PAM-75.

Figure 10:
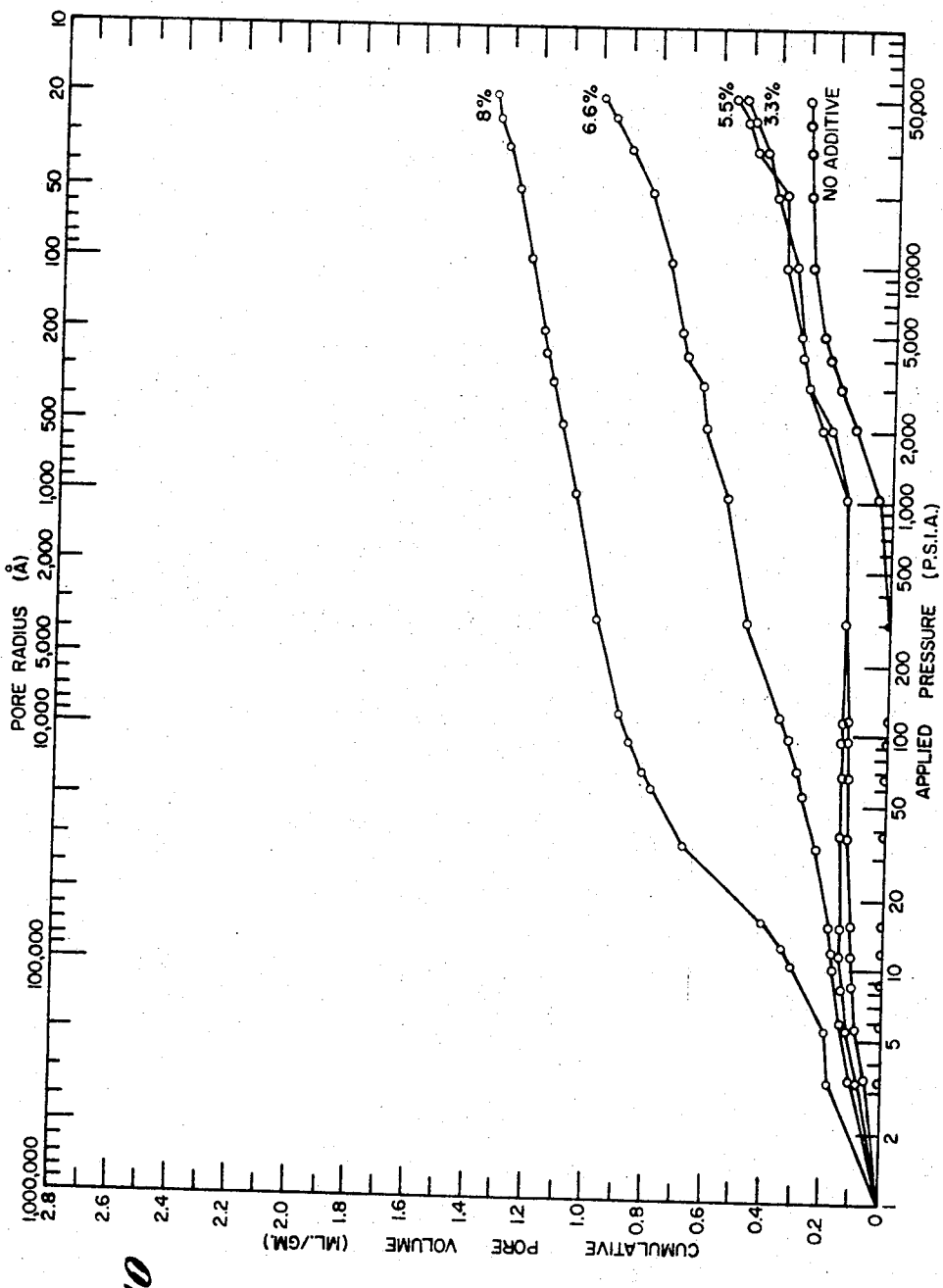
FIGURE 10 shows the effect of PAM-75 on the cumulative pore volume distribution in alumina gel. (Prepared by mixing the hydrous gel into a concentrated solution of PAM-75)
Figure 11:
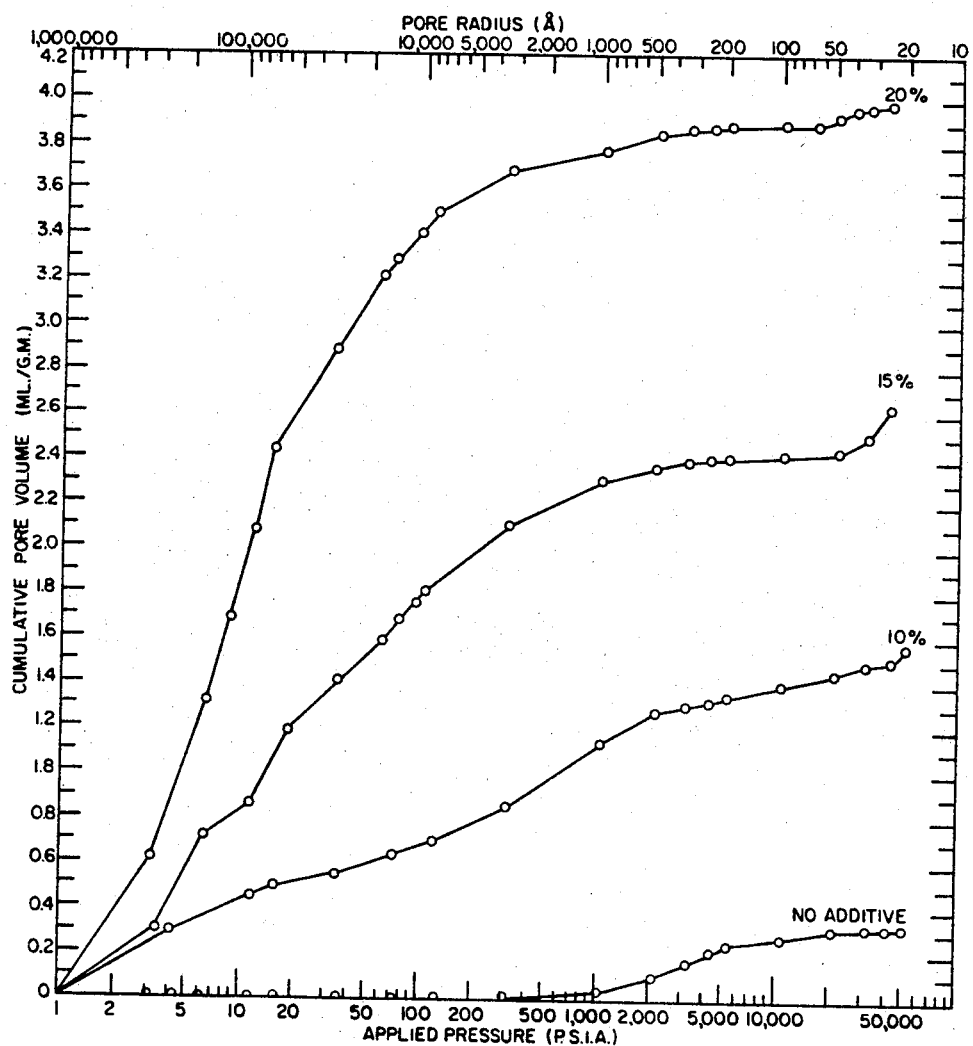
FIGURE 11 shows the effect of Gelvatol-1-30 on the cumulative pore volume distribution in alumina gel. (Prepared by precipitating the gel in the presence of the dissolved additive)
Figure 12:
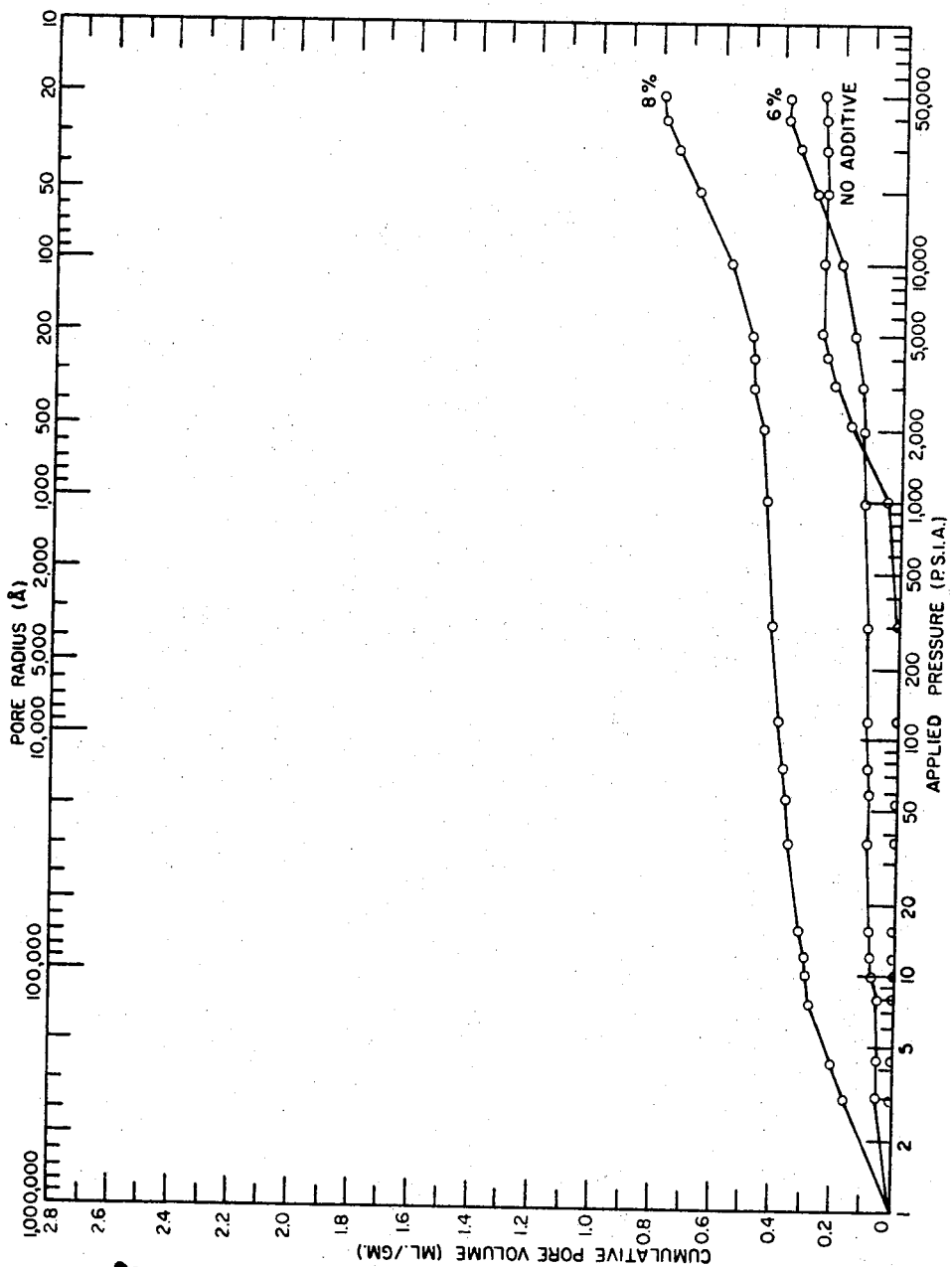
FIGURE 12 shows the effect of Gelvatol-1-30 on the cumulative pore volume distribution in alumina gel. (Prepared by mixing the hydrous gel into a concentrated solution of Gelvatol-1-30)

With both of these additives, PAM and Gelvatol, the effects are greatest when the additive is dissolved in the solutions used to prepare the gel, i.e., the mixture of gel and polymer is prepared by precipitating the gel in the presence of the polymer. To a degree the changes in the pore size distribution also occur when the additive is blended into the hydrous gel after it is formed, as shown in FIGURES 10 and 12. An important point to notice in these figures is that the amount of PAM or Gelvatol additive required to open up the pore structure of alumina is considerably less than is the case with the Carbowax additives. The effect of 8% PAM-75 on the overall pore volume in alumina was approximately equal to the effect of 50% Carbowax 4000. The pore range effected by each additive was slightly different, however. PAM-75 brought about a significant increase in the pore volume contained in the pore range 100,000 to 50 A., while the effect of Carbowax 4000 was restricted to the 1000 to 50 A. range.

Figure 13:
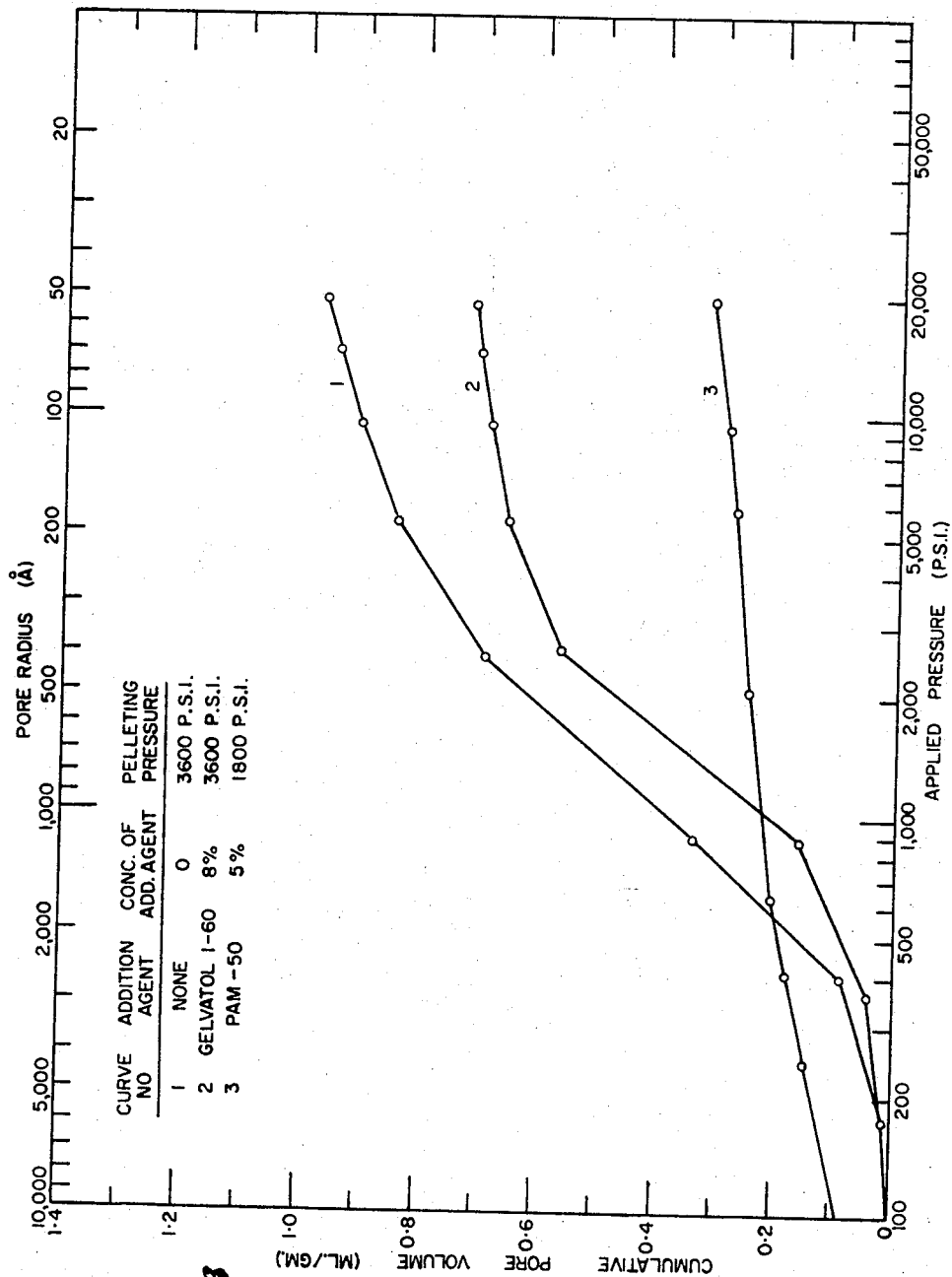
FIGURE 13 shows the modification of the cumulative pore volume distribution by pelleting at constant pressure i.e. to a chosen pellet density-⅛″ pellets of alumina-silica gel.

All of the cumulative pore volume curves shown above were obtained with gels in the granular form. Each type of distribution can be further modified by the use of proper pelleting technique. Most of the distribution curves obtained with the granular gels extended over quite wide ranges, say $10^5$ to $10^4$ A. radius or $10^4$ to $10^3$ A. radius. By proper pelleting, a granular or powdered gel with a wide pore distribution in one range can be made into a pellet with a much more narrow pore distribution in the next lower range. For example, a gel made with polyvinyl alcohol (Gelvatol 1–60) or polyacrylamide (PAM-50) in the granular form has a wide pore system in the very large pore region. By grinding this type of gel lightly and pelleting at a low pressure, pellets can be made containing a relatively sharp pore volume distribution in the region of 1000 A. radius. The distributions obtained in ⅛ inch diameter pellets prepared at 1800 and 3600 p.s.i. pelleting pressure are shown in FIGURE 13. Of course, it must be appreciated that the process of grinding and pelleting greatly reduces the total pore volume of these gels. In the granular form, gels made with PAM or Gelvatol have total pore volumes in the region of 4 to 5 ml./gm. In the pelleted form the total pore volume is approximately .6 to 1 ml. per gram.

Although conventional pelleting apparatus operating on a constant volume basis has been found to be adequate for the purpose of modifying the pore structure of a gel, a much superior technique is to pellet at a constant pressure. It has been found that slight variations in the rate of feed of the powdered gel in a constant volume punch and die assembly can change the actual pelleting pressure and hence the pore volume distribution to a great extent. The present inventors modified a conventional pellet press such that the lower die was supported against a hydraulic ram connected to an air ballast tank maintained at a predesignated pressure. In this way, when the desired pellet pressure was attained, the die and ram slipped against the air cushion in the ballast tank. For this type of apparatus it is essential that friction between the punch and die be kept to a minimum. At low pelleting pressures it was found necessary to pressure lubricate the die with a substance such as liquid polyethylene glycol (Carbowax 200) to reduce friction. A lubricant such as this can be easily removed from the pellets later by calcination or hydrogenation, etc. In the case of alumina gel which is a very hard and abrasive substance, the lubrication of the punch and die assembly is advisable regardless of the operating pressure simply as a means of extending the life of the apparatus. A very small amount of liquid polyethylene glycol fed to the punch and die extended the operating life upwards of 1000 times.

Figure 14:
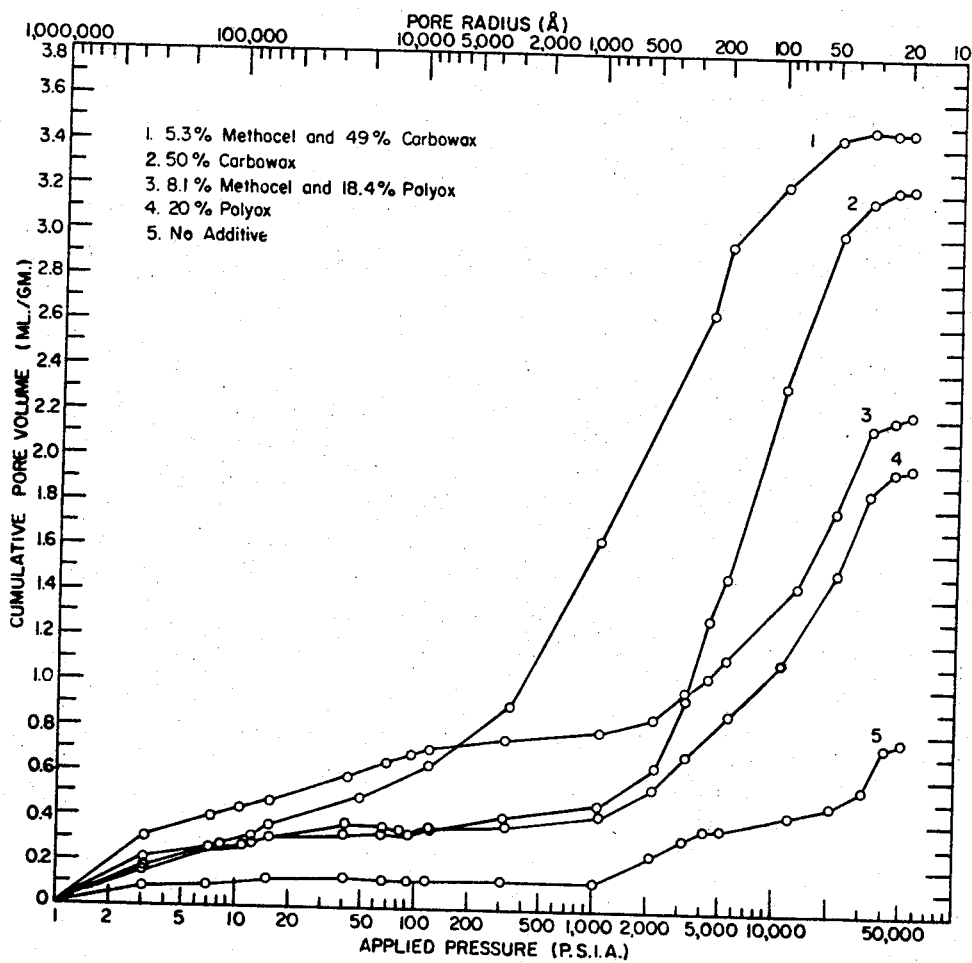
FIGURE 14 shows the effect of a combination of additives on the cumulative pore volume in alumina gel. (Prepared by mixing the molten or powdered additives into Reheis compressed by hydrous gel type F-500).

Another way of modifying the effect of one addition agent on the pore structure of a gel is to add a second addition agent. An indication of the effects that can be obtained selecting various combinations of additives is shown in FIGURE 14. In general, the addition of Methocel to either Carbowax or Polyox mixtures has the effect of broadening the pore size distribution obtained with either separately. The principal effects of each of the additives alone have already been described.

A summary of the additives and methods used to control the pore volume and pore size distribution in various pore size ranges is shown in Table 1. In the first part of the table, the general effect obtained is classified by the group of the addition agent. What is meant by each group has already been presented. In the second portion of the table, the effect of chemical and physical methods of modifying the pore structure obtained with the three groups of additives is shown by arrows. The base, or feather, of the arrow indicating the original or "normal" pore size distribution, and the point of the arrow indicating the range in which the method moves the pore size distribution.

TABLE 1

A Schematic Representation of Methods of Increasing the Pore Volume in Selected Pore Size Ranges for Alumina, Silica and Mixtures of Alumina and Silica Gels

| Pore Size Range Radius, A. Units | $10^5$–$10^4$ | $10^4$–$10^3$ | 1,000–100 | 100 |
|---|---|---|---|---|
| Group Number or Class of Additives Effective for an Increase in Pore Volume. | 2 and 3 | 2 and 3 | 1 and 3 | 1. |
| Chemical Modification of Effect of Additives. | Mixtures of Groups 1 and 2. ←――――→ | | Small Amounts of Group 1. | |
| Physical Modifications of the Effect of Additives (Pelleting at Constant Pressure). | ――――→ ――――→ | ――――→ | ――――→ ――――→ | ――――→ |

We claim:

1. A process for the preparation of light, porous, dried, calcined, substantially pure, inorganic oxides, said oxides having a substantial pore volume in a desired pore size range within the limits of 20 A° to $10^5$ A°, said process comprising:
   (a) forming a mixture selected from the group consisting of:
      (i) a mixture consisting essentially of the hydrous gel of alumina with a least one water dispersible, organic polymer selected from the group consisting of polyvinyl alcohols, polyethylene glycols, polyethylene oxides, methyl celluloses and polyacrylamines;
      (ii) a mixture consisting essentially of the hydrous gel of a mixture of alumina and silica with at least one water dispersible, organic polymer selected from the group consisting of polyvinyl alcohols, polyethylene glycols, polyethylene oxides, methyl celluloses, and polyacrylamides; and
      (iii) a mixture consisting essentially of the hydrous gel of silica with at least one water dispersible, organic polymer selected from the group consisting of polyethylene glycols, polyethylene oxides and methyl celluloses; the amount of said polymer being not less than about 30% based on the weight of anhydrous inorganic oxide said amount being dispersible in said hydrous gel;
   (b) drying the mixture of said hydrous gel and said polymer at a temperature not exceeding about 250° C. to remove a major amount of the water and to set the pore structure of the inorganic matter contained in said mixture; and
   (c) calcining said dried mixture to remove said polymer completely therefrom whereby to obtain a substantially pure inorganic oxide material.

2. The process according to claim 1 wherein said step (c) comprises:
   (c) heating the dried mixture to a temperature of 500–600° C. in an inert atmosphere at least partially to decompose said polymer, and gradually replacing the inert atmosphere by an oxygen-containing atmosphere, whereby to remove completely said polymer therefrom and to obtain a substantially pure inorganic oxide mixture.

3. The process according to claim 1 wherein said step (c) comprises:
   (c) heating the dried mixture to a temperature of 500–600° C. in an inert atmosphere at least partially to decompose said polymer, and gradually replacing the inert atmosphere by an oxygen-containing atmosphere, whereby to calcine said oxide, completely to remove said polymer therefrom.

4. A process according to claim 1 and including the additional steps of:
   (d) grinding said calcined substantially pure inorganic oxide material;
   (e) compacting said material after grinding whereby to modify the pore structure thereof.

5. A process as claimed in claim 1, in which said mixture defined in step (a) is formed by:
   (i) dispersing at least one water dispersible organic polymer selected from the group consisting of polyvinyl alcohols, polyethylene glycols, polyethylene oxides, and polyacrylamides in an aqueous solution of an aluminum salt which will yield hydrous aluminum hydroxide gel on precipitation, the concentration of said polymer in said salt solution being limited by the solubility and dispersibility of the selected polymer, the amount of said polymer being not less than 30% and not more than 20,000% of the weight of the anhydrous oxide contained in said dispersion,
   (ii) bringing about the precipitation of a hydrous gel of alumina as a hydrous mixture of said gel and said polymer, and
   (iii) washing and filtering said hydrous mixture where necessary.

6. A process as claimed in claim 1 in which said mixture defined in step (a) is formed by
   (i) providing a hydrous alumina gel, and
   (ii) adding thereto at least one water dispersible organic polymer selected from the group consisting of polyvinyl alcohols, polyethylene glycols, polyethylene oxides, methyl celluloses and polyacrylamides, the concentration of said polymer in said salt solution being limited by the solubility and dispersibility of the selected polymer, the amount of said polymer being not less than 30% and not more than 20,000% of the weight of the anhydrous oxide contained in said dispersion.

7. The process according to claim 6, wherein said step (c) comprises:
   (c) heating the dried mixture to a temperature of 500–600° C. in an inert atmosphere at least partially to decompose said polymer, and gradually replacing the inert atmosphere by an oxygen-containing atmosphere, whereby to calcine said oxide, completely to remove said polymer therefrom.

8. A process as claimed in claim 1 in which said mixture defined in step (a) is formed by
   (i) providing an alumina silica gel
   (ii) adding thereto at least one water dispersible organic polymer selected from the group consisting of polyvinyl alcohols, polyethylene glycols, polyethylene oxides, methyl celluloses and polyacrylamides, the concentration of said polymer in said salt solution being limited by the solubility and dispersibility of the selected polymer, the amount of said polymer being not less than 30% and not more than 20,000% of the weight of the anhydrous oxides contained in said dispersion.

9. The process according to claim 8 wherein said step (c) comprises:
   (c) heating the dried mixture to a temperature of 500–600° C. in an inert atmosphere at least partially to decompose said polymer, and gradually replacing the inert atmosphere by an oxygen-containing atmosphere, whereby to calcine said oxide, completely to remove said polymer therefrom.

10. A process as claimed in claim 1 in which mixture is formed by:
(i) providing a hydrous silica gel
(ii) adding thereto at least one water dispersible organic polymer selected from the group consisting of polyethylene glycols, polyethylene oxides, and methyl celluloses, the concentration of said polymer in said mixture being limited by the solubility and dispersibility of the selected polymer, the amount of said polymer being not less than 30% and not more than 20,000% of the weight of the anhydrous oxide contained in said dispersion.

11. The process according to claim 10, wherein said step (c) comprises:
(c) heating the dried mixture to a temperature of 500–600° C. in an inert atmosphere at least partially to decompose said polymer, and gradually replacing the inert atmosphere by an oxygen-containing atmosphere, whereby to calcine said oxide, completely to remove said polymer therefrom.

12. A process according to claim 1 in which said mixture defined in step (a) is formed by:
(i) dispersing at least one water dispersible organic polymer selected from the group consisting of polyvinyl alcohols, polyethylene glycols, polyethylene oxides, and polyacrylamides in aqueous solutions of aluminum and silicate salts which when mixed together will precipitate a mixture of hydrous gels of alumina and silica, the concentration of said polymer in said salt solution being limited by the solubility and dispersibility of the selected polymer, the amount of said polymer being not less than 30 percent and not more than 20,000 percent of the weight of the anhydrous oxide contained in said dispersion,
(ii) mixing the solutions and bringing about the precipitation of said hydrous gel of alumina and silica as a hydrous mixture of said gel and said polymer, and
(iii) washing and filtering said hydrous mixture where necessary.

13. The process according to claim 12 wherein said step (c) comprises:
(c) heating the dried mixture at least partially to decompose said polymer, and gradually replacing the inert atmosphere by an oxygen-containing atmosphere, whereby to calcine said oxide, completely to remove said polymer therefrom.

References Cited
UNITED STATES PATENTS

| | | | |
|---|---|---|---|
| 2,900,349 | 8/1959 | Schwartz | 252—317 |
| 2,852,474 | 9/1958 | Arundale et al. | 252—455 |
| 2,966,466 | 12/1960 | Schwartz | 252—453 |

LEON D. ROSDOL, *Primary Examiner.*

R. D. LOVERING, *Assistant Examiner.*

U.S. Cl. X.R.

23—113; 252—451, 453, 455

UNITED STATES PATENT OFFICE
CERTIFICATE OF CORRECTION

Patent No. 3,417,028                               December 17, 19

Douglas Sargent Montgomery et al.

It is certified that error appears in the above identified patent and that said Letters Patent are hereby corrected as shown below:

In the heading to the printed specification, lines 5 to 7, "Douglas Sargent Montgomery, 101 Broadway, Ottawa, Ontario, Canada, and Basil Ian Parsons, R.R. 1, Kars, Ontario, Canada" should read -- Douglas Sargent Montgomery, Ottawa, Ontario, Canada, and Basil Ian Parsons, Kars, Ontario, Canada, assignors to Her Majesty the Queen in right of Canada as represented by the Minister of Mines & Technical Surveys --.

Signed and sealed this 24th day of March 1970.

(SEAL)
Attest:

Edward M. Fletcher, Jr.                       WILLIAM E. SCHUYLER, JR.
Attesting Officer                                  Commissioner of Patents